(12) United States Patent
Noda et al.

(10) Patent No.: US 6,905,987 B2
(45) Date of Patent: Jun. 14, 2005

(54) FIBERS COMPRISING POLYHYDROXYALKANOATE COPOLYMER/ POLYLACTIC ACID POLYMER OR COPOLYMER BLENDS

(75) Inventors: Isao Noda, Fairfield, OH (US); Eric Bryan Bond, Maineville, OH (US); David Harry Melik, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 67 days.

(21) Appl. No.: 10/051,723

(22) Filed: Jan. 17, 2002

(65) Prior Publication Data

US 2002/0143116 A1 Oct. 3, 2002

Related U.S. Application Data

(60) Provisional application No. 60/278,948, filed on Mar. 27, 2001.

(51) Int. Cl.$^7$ ............................ D04H 1/04; B32B 27/36
(52) U.S. Cl. ......................... 442/364; 442/50; 442/51; 442/327; 428/373; 428/395; 525/411; 525/938
(58) Field of Search ..................... 428/373, 395; 442/50, 51, 327, 364; 525/411, 938

(56) References Cited

U.S. PATENT DOCUMENTS

| | | |
|---|---|---|
| 5,489,470 A | 2/1996 | Noda |
| 5,498,692 A | 3/1996 | Noda |
| 5,502,116 A | 3/1996 | Noda |
| 5,536,564 A | 7/1996 | Noda |
| 5,602,227 A | 2/1997 | Noda |
| 5,618,855 A | 4/1997 | Noda |
| 5,653,930 A | 8/1997 | Noda et al. |
| 5,685,756 A | 11/1997 | Noda |
| 5,747,584 A | 5/1998 | Noda |
| 5,780,368 A | 7/1998 | Noda |
| 5,821,299 A | 10/1998 | Noda et al. |
| 5,849,854 A | 12/1998 | Noda |
| 5,939,467 A * | 8/1999 | Wnuk ..................... 523/123 |
| 5,990,271 A | 11/1999 | Noda |
| 6,013,590 A | 1/2000 | Noda |
| RE36,548 E | 2/2000 | Noda |
| 6,027,787 A | 2/2000 | Noda |
| 6,077,931 A | 6/2000 | Noda |
| 6,143,947 A | 11/2000 | Noda |
| 6,160,199 A | 12/2000 | Noda |
| 6,174,602 B1 * | 1/2001 | Matsui ..................... 428/373 |
| 6,174,990 B1 | 1/2001 | Noda |

FOREIGN PATENT DOCUMENTS

| | | |
|---|---|---|
| EP | 0753539 A1 | 1/1997 |
| EP | 0993832 A1 | 4/2000 |
| JP | 10147653 | 6/1998 |
| JP | 11269754 A | 10/1999 |
| WO | WO 95/20615 A1 | 8/1995 |
| WO | WO 96/08535 A1 | 3/1996 |

OTHER PUBLICATIONS

Pending Application of Noda et al., Ser. No. 10/051,724, filed Jan. 17, 2002. (8840).

* cited by examiner

*Primary Examiner*—Jeffrey B. Robertson
(74) *Attorney, Agent, or Firm*—Julie A. McConihay; Angela Marie Stone; Leonard W. Lewis

(57) ABSTRACT

Environmentally degradable melt spun fibers comprising a polyhydroxyalkanoate copolymer and a polylactic acid polymer or copolymer are disclosed. A preferred configuration of the present invention is directed to environmentally degradable fibers comprising a sheath/core structure where the core comprises a biodegradable polyhydroxyalkanoate copolymer and the sheath comprises a polymer or copolymer of polylactic acid. Nonwoven webs and disposable articles comprising the environmentally degradable fibers are also disclosed.

21 Claims, No Drawings

FIBERS COMPRISING POLYHYDROXYALKANOATE COPOLYMER/ POLYLACTIC ACID POLYMER OR COPOLYMER BLENDS

The present application claims benefit of U.S. Ser. No. 60/278,948 filed Mar. 27, 2001.

FIELD OF THE INVENTION

The present invention relates to environmentally degradable fibers comprising polyhydroxyalkanoate copolymer and a polylactic acid polymer or copolymer. The fibers are used to make nonwoven, disposable articles.

BACKGROUND OF THE INVENTION

This invention relates to the need for alleviating the growing environmental problem of excessive plastic waste that makes up an increasing volume fraction of materials in landfills. Biodegradable polymers and products formed from biodegradable polymers are becoming increasingly important in view of the desire to reduce the volume of solid waste materials generated by consumers each year. The invention further relates to the need for developing new plastic materials that can be used in applications where biodegradability, compostability or biocompatibility, are among primary desirable features of such applications. There have been many attempts to make degradable articles. However, because of costs, the difficulty in processing, and end-use properties, there has been little commercial success. Many compositions that have excellent degradability have only limited processability. Conversely, compositions which are more easily processable have reduced degradability.

Useful fibers with excellent degradability for nonwoven articles are difficult to produce relative to films and laminates. This is because the material and processing characteristics for fibers are much more stringent, i.e., the processing time is typically much shorter and flow characteristics are more demanding on the material's physical and rheological characteristics. The local strain and shear rates are much greater in fiber production than other processes. Additionally, a homogeneous melt is required for fiber spinning. For spinning very fine fibers, small defects, slight inconsistencies, or non-homogeneity in the melt are not acceptable for a commercially viable process. The more attenuated the fibers, the more critical the processing conditions and selection of materials. New materials would ideally need to exhibit many of the physical characteristics of conventional polyolefins. They must be water impermeable, tough, strong, yet soft, flexible, rattle-free, cost-effective, and must be capable of being produced on standard polymer processing equipment in order to be affordable.

To produce fibers that have more acceptable processability and end-use properties, choosing acceptable degradable polymers is challenging. The degradable polymers must have good spinning properties and a suitable melting temperature. The melting temperature must be high enough for end-use stability to prevent shrinkage or melting. These requirements make selection of a degradable polymer to produce fibers very difficult.

Polyhydroxyalkanoates (PHAs) are generally semicrystalline, thermoplastic polyester compounds that can either be produced by synthetic methods or by a variety of microorganisms, such as bacteria or algae. The latter typically produce optically pure materials. Traditionally known bacterial PHAs include isotactic poly(3-hydroxybutyrate), or PHB, the high-melting, highly crystalline, very fragile/brittle, homopolymer of hydroxybutyric acid, and isotactic poly(3-hydroxybutyrate-co-valerate), or PHBV, the somewhat lower crystallinity and lower melting copolymer that nonetheless suffers the same drawbacks of high crystallinity and fragility/brittleness. PHBV copolymers are described in Holmes, et al. U.S. Pat. Nos. 4,393,167 and 4,477,654; and until recently were commercially available from Monsanto under the trade name BIOPOL. Their ability to biodegrade readily in the presence of microorganisms has been demonstrated in numerous instances. These two types of PHAs however are known to be fragile polymers which tend to exhibit brittle fracture and/or tear easily under mechanical constraint. Their processability is also quite problematic, since their high melting point requires processing temperatures that contribute to their extensive thermal degradation while in the melt. Finally, their rate of crystallization is noticeably slower than traditional commercial polymers, making their processing very difficult or cost-prohibitive on existing converting equipment.

Other known PHAs are the so-called long side-chain PHAs, or isotactic polyhydroxyoctanoates (PHOs). These, unlike PHB or PHBV, are virtually amorphous owing to the recurring pentyl and higher alkyl side-chains that are regularly spaced along the backbone. When present, their crystalline fraction however has a very low melting point as well as an extremely slow crystallization rate. For example, Gagnon, et al. in Macromolecules, 25, 3723–3728 (1992), incorporated herein by reference, shows that the melting temperature is around 61° C. and that it takes about 3 weeks to reach the maximum extent of crystallization at its optimal crystallization temperature.

Further poly(3-hydroxyalkanoate) copolymer compositions have been disclosed by Kaneka (U.S. Pat. No. 5,292,860) and Procter & Gamble (U.S. Pat. Nos. 5,498,692; 5,536,564; 5,602,227; 5,685,756). All describe various approaches of tailoring the crystallinity and melting point of PHAs to any desirable lower value than in the high-crystallinity PHB or PHBV by randomly incorporating controlled amounts of "defects" along the backbone that partially impede the crystallization process. Such "defects" are either branches of different types (3-hydroxyhexanoate and higher) or shorter (3HP, 3hydroxypropionate) or longer (4HB, 4-hydroxybutyrate) linear aliphatic flexible spacers. The results are semicrystalline copolymer structures that can be tailored to melt in the typical use range between 80° C. and 150° C. and that are less susceptible to thermal degradation during processing. In addition, the biodegradation rate of these copolymers is higher as a result of their lower crystallinity and the greater susceptibility to microorganisms. Yet, whereas the mechanical properties and melt handling conditions of such copolymers are generally improved over that of PHB or PHBV, their rate of crystallization is characteristically slow, often slower than PHB and PHBV.

In general, however, it has been a considerable challenge to convert these newer PHA copolymers, as well as other biodegradable polymers, into useful forms by conventional melt methods, for they remain substantially tacky after they are cooled down from the melt, and remain as such until sufficient crystallinity sets in, particularly with PHA copolymers levels above 10 wt %. Residual tack typically can lead to material sticking to itself or to the processing equipment, or both, and thereby can restrict the speed at which a polymeric product is produced or prevent the product from being collected in a form of suitable quality. Consequently, there is a need for an inexpensive and melt processable composition of degradable polymers. Moreover, the polymer composition should be suitable for use in conventional processing equipment. There is also a need for disposable articles containing nonwoven webs made from these fibers.

SUMMARY OF THE INVENTION

Environmentally degradable melt spun fibers comprising a polyhydroxyalkanoate copolymer (PHA) and a polylactic acid polymer or copolymer (PLA) are disclosed. Such compositions, either as blends or different components, generally provide material properties different and improved in any one or more properties as compared to PHA copolymers alone or to PLA polymers or copolymers alone. Properties in which the blended materials are different and improved are any one of hardness/softness, brittleness/flexibility, tack, i.e., stickiness, toughness, ductility, processability, or opaqueness/transparency, for example. A preferred configuration of the present invention is directed to biodegradable fibers comprising a sheath/core structure where the core comprises a biodegradable polyhydroxyalkanoate copolymer and the sheath comprises a PLA polymer or copolymer. Nonwoven webs and disposable articles comprising the environmentally degradable fibers are also disclosed.

DETAILED DESCRIPTION OF THE INVENTION

All percentages, ratios and proportions used herein are by weight percent of the composition, unless otherwise specified.

The specification contains a detailed description of (1) materials of the present invention, (2) configuration of the fibers, (3) material properties of the fibers, (4) processes, and (5) articles.

The present invention is directed toward fibers comprising environmentally degradable polymers. A first polymer is biodegradable and is a polyhydroxyalkanoate copolymer as set forth infra. A second polymer is an environmentally degradable PLA polymer as set forth infra. The polyhydroxyalkanoate copolymer will make the fiber rapidly environmentally degradable. The second PLA polymer will make the polymer blend spinnable and help to prevent stickiness that is commonly associated with polyhydroxyalkanoate polymers.

A preferred configuration of the present invention is directed to environmentally degradable complex fibers comprising a sheath-core structure. In this preferred configuration, PHA majority blends may be placed in the core with a PLA polymer in the sheath. Another preferred configuration are blends of PHA with a PLA polymer spun into monocomponent multiconstituent fibers. These blends may also be placed in the sheath of sheath-core bicomponent fibers, provided they crystallize in the spinline or vitrify sufficiently during the fiber formation process to avoid the processing problems of fiber tackiness or shrinkage.

(1) Materials
Polyhydroxyalkanoate Copolymers (PHAs)

The biodegradable fibers are formed in part from a composition comprising at least a first environmentally degradable polyhydroxyalkanoate copolymer comprising at least two randomly repeating monomer units (RRMUs). The first RRMU has the structure (I):

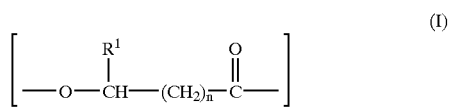

wherein $R^1$ is H, or C1 or C2 alkyl, and n is 1 or 2. In a preferred embodiment, R1 is a methyl group ($CH_3$). In a further preferred embodiment of the first RRMU, R1 is methyl and n is 1, whereby the polyhydroxyalkanoate copolymer comprises 3-hydroxybutyrate units.

The second RRMU included in the biodegradable polyhydroxyalkanoate copolymer comprises at least one monomer selected from the group consisting of the structures (II) and (III):

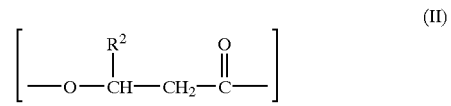

wherein $R^2$ is a C3–C19 alkyl or C3–C19 alkenyl, and

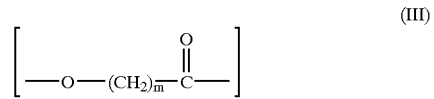

wherein m is from 2 to about 9. Generally, in the RRMU of formula (II), the length of $R^2$ will, to some extent, influence the reduction in overall crystallinity of the copolymer. In a preferred embodiment, $R^2$ is a C3–C15 alkyl group or alkenyl group. In a further preferred embodiment, $R^2$ is a C3–C9 alkyl group, and in a further preferred embodiment, $R^2$ is a C5 alkyl group. In alternately preferred embodiments, $R^2$ is a C15–C19 alkyl or alkenyl group. Preferably m is from 2 to 5, more preferably m is 3. Additionally, in the RRMU of formula (II), the length of $(CH_2)_m$ will generally, to some extent, influence the reduction in overall crystallinity of the copolymer. In a preferred embodiment, m is from 2 to 9, and more preferably is from 2 to 5. In a further preferred embodiment, m is 3.

Preferably, to obtain the advantageous combination of physical properties exhibited by the fibers when using the polyhydroxyalkanoate composition, at least about 50 mole percent of the copolymer comprise RRMUs having the structure of the first RRMU of formula (I). Suitably, the molar ratio of the first RRMUs to the second RRMU in the copolymer is in the range of from about 50:50 to about 98:2. More preferably, the molar ratio is in the range of from about 75:20 to about 95:5, and even more preferred, the mole ratio is in the range of from about 80:20 to about 90:10. In addition, the polyhydroxyalkanoate copolymer suitably has a number average molecular weight of greater than about 150,000 g/mole, and further having a melting point designated Tm 1.

In further embodiments of the first polyhydroxyalkanoate copolymer employed in the compositions of the complex fiber, one or more additional RRMUs may be included. Suitably, the additional RRMUs may have the structure (IV):

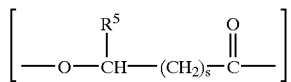

wherein $R^5$ is H, or a C1–C19 alkyl or alkenyl group and s is 1 or 2, with the provision that the additional RRMUs are not the same as the first or second RRMUs.

In further preferred embodiments, the polyhydroxyalkanoate composition further comprises a second biodegradable polyhydroxyalkanoate homo- or copolymer, or blend thereof. A preferred second PHA polymer or copolymer comprises at least one randomly repeating monomer unit having the structure (V):

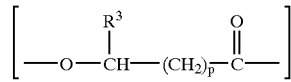

wherein $R^3$ is H, or C1 or C2 alkyl, and p is 1 or 2. In a preferred embodiment, $R^3$ is a methyl group ($CH_3$). In a further preferred embodiment, $R^3$ is methyl and p is 1, whereby the second polyhydroxyalkanoate polymer comprises 3-hydroxybutyrate units. In a further preferred embodiment, the second polyhydroxyalkanoate polymer is the polyhydroxybutyrate homopolymer. Optionally, the second environmentally degradable polymer comprises two or more additional randomly repeating monomer units selected from the group consisting of the structures (VI) and (VII):

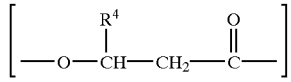

wherein $R^4$ is a C2–C19 alkyl or C2–C19 alkenyl, and

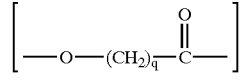

wherein q is from 2 to about 16. With reference to the second RRMU comprising a monomer of structure (VII), in a preferred embodiment, q is from 2 to about 10, and more preferably is from about 4 to about 8. In a further preferred embodiment, q is about 5. When present, the additional randomly repeating monomer units represent no more than 25% of the total monomer units, preferably less than 15%, wherein the second polyhydroxyalkanoate homo- or copolymer suitably has a number average molecular weight of greater than about 50,000 g/mole. Further, the second biodegradable polyhydroxyalkanoate has a melting point Tm2 which is at least about 20° C. greater than the melting point, Tm 1, of the first biodegradable polyhydroxyalkanoate, so that the equation Tm 2>Tm 1+20° C. is satisfied. The value of the melting point is generally determined by DSC (Differential Scanning Calorimetry) and is taken as the highest endothermic peak temperature observed on the DSC heating scan using, for example, the method outlined in ASTM D 3418. Although not intending to be bound by theory, it is believed that the second biodegradable polyhydroxyalkanoate can act as a nucleating agent for the first biodegradable polyhydroxyalkanoate and thereby improve the crystallization rate of the first biodegradable polyhydroxyalkanoate if the adequate blend composition, structure and high level of dispersion is achieved.

If the second polyhydroxyalkanaote copolymer is used as described above, a majority of the PHA composition comprises the first biodegradable polyhydroxyalkanoate copolymer, whereby the second biodegradable PHA is finely dispersed throughout a continuous phase or matrix of the first copolymer and is included in an amount sufficient to improve the crystallization rate and/or physical properties of the first copolymer. In one embodiment, compositions comprise from about 0.01 to about 10 weight percent of the second PHA copolymer, based on the total weight of the first and second PHA copolymers. In more specific embodiments, the compositions comprise from about 0.1 to about 5 weight percent of the second PHA. In even more specific embodiments, the compositions comprise from about 0.1 to about 3 weight percent of the second PHA copolymer.

The environmentally degradable polyhydroxyalkanoate copolymers can be synthesized by chemical or biological methods as disclosed, for example, by Noda in U.S. Pat. No. 5,618,855, and Noda, et al. in U.S. Pat. No. 5,942,597, both of which are incorporated herein by reference.

The copolymer may be present as a continuous phase in the composition. The compositions may include a combination of polyhydroxyalkanoate copolymers, or a combination with other polymeric components, for example additional polyester components or the like. Typically, the polyhydroxyalkanoate copolymers are present in an amount of from 1% to 90%, or 10% to 90%, preferably from 10% to 80%, more preferably from 30% to 70%, and most preferably from 40% to 60%, by weight of the fiber.

Environmentally Degradable Thermoplastic PLA Polymers or Copolymers

Environmentally degradable thermoplastic PLA polymers or copolymers that are substantially compatible with PHA are also required in the present invention. As used herein, the term "substantially compatible" means when heated to a temperature above the softening and/or the melting temperature of the composition, the polymer is capable of forming a substantially homogeneous mixture with the PHA after mixing with shear or extension. The PLA polymer or copolymer used must be able to flow upon heating to form a processable melt and resolidify as a result of crystallization or vitrification.

The PLA polymer or copolymer must have a melting temperature sufficiently low for processability and yet be sufficiently high for thermal stability during use of the fiber. Suitable melting temperatures are from about 80° to about 190° C. and preferably from about 90° to about 180° C. Preferred is a homopolymer or copolymer of polylactic acid having a melting temperature from about 160° to about 175° C. The polymer must have rheological characteristics suitable for melt spinning.

The environmentally degradable thermoplastic PLA polymers must be able to solidify fairly rapidly, preferably under extensional flow, and form a thermally stable fiber structure, as typically encountered in known processes as staple fibers (spin draw process) or spunbond continuous filament process.

The environmentally degradable PLA polymers suitable for use herein are those materials which are susceptible to being hydrolytically biodegradable, the hydrolytic products being assimilated by microorganisms such as molds, fungi, or bacteria when the material is buried in the ground or otherwise comes in contact with the microorganisms including contact under aqueous or saline environmental conditions conducive to the growth of the microorganisms. Suitable PLA polymers also include those materials where hydrolytic products are degradable using aerobic or anaerobic digestion procedures, or by virtue of being exposed to environmental elements such as sunlight, rain, moisture, wind, temperature, or the like. The PLA polymers can be used individually or as a combination of polymers provided that the polymers are degradable by biological and/or environmental means.

Specific examples of preferred lactic acid polymers or lactide polymers suitable for use herein include, but are not limited to, those polylactic acid-based polymers or polylactide-based polymers that are generally referred to in the industry as "PLA". Therefore, the terms "polylactic acid", "polylactide" and "PLA" are used interchangeably to include homopolymers or copolymers of lactic acid or lactide based on polymer characterization of the polymers being formed from a specific monomer or the polymers being comprised of the smallest repeating monomer units. It should be understood, however, that the terms "polylactic acid", "polylactide", and "PLA" are not intended to be limiting with respect to the manner in which the polymer is formed.

The polylactic acid or polylactide polymers generally have a lactic acid residue repeating monomer unit that conforms to the following formula

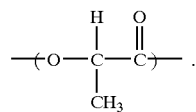

Typically, polymerization of lactic acid or lactide will result in polymers comprising at least about 50% by weight of lactic acid residue repeating units, lactide residue repeating units, or combinations thereof. These lactic acid and lactide polymers include homopolymers and copolymers such as random and/or block copolymers of lactic acid and/or lactide. The lactic acid residue repeating monomer units can be obtained from L-lactic acid, D-lactic acid or D,L-lactic acid, preferably with L-isomer levels up to 75%.

The molecular weight of the degradable polymer must be sufficiently high to enable entanglement between polymer molecules and yet low enough to be melt spinnable. For melt spinning, PLA polymers or copolymers have weight average molecular weights of from 10,000 g/mol to about 600,000 g/mol, preferably below 500,000 g/mol or 400,000 g/mol, more preferably from about 50,000 g/mol to about 300,000 g/mol or 30,000 g/mol to about 400,000 g/mol, and most preferably from about 100,000 g/mol to about 250,000 g/mol, or from 50,000 g/mol to about 200,000 g/mol. An example of commercially available polylactic acid polymers include a variety of polylactic acids that are available from the Chronopol Inc. (Golden, Colo.), or polylactides sold under the tradename EcoPLA®. Further examples of suitable commercially available polylactic acid is NATUREWORKS from Cargill Dow, LACEA from Mitsui Chemical, or L5000 from Biomer. When using PLA, it is preferred that the PLA is in the semi-crystalline form. To form semi-crystalline PLA, it is preferred that at least about 90 mole percent of the repeating units in the polylactide be one of either L- or D-lactide, and even more preferred at least about 95 mole percent. The processing is conducted in such a way that facilitates crystalline formation, for example, using high spinning speeds or spin draw/anneal process. When using PLA as a core material, either the amorphous or the semi-crystalline form are acceptable, where the chosen form will depend in part on the chosen application and therefore on the desired properties, for example, ductility and strength.

Depending upon the specific polymer used, the process, and the final use of the fiber, more than one polymer may be desired. For example, if a crystallizable polylactic acid having a melting temperature of from about 160° to about 175° C. is used, a second polylactic acid having a lower melting point and lower crystallinity than the other polylactic acid and/or a higher copolymer level may be used. Alternatively, an aliphatic aromatic polyester may be used with crystallizable polylactic acid.

Typically, the PLA polymer or copolymer is present in an amount of from 1% to 90%, or 10% to 90%, preferably from 10% to 80%, more preferably from 30% to 70%, and most preferably from 40% to 60%, by weight of the fiber.

Further Ingredients

A plasticizer can be used in the present invention. The plasticizers are sufficiently compatible with the polymeric components of the present invention so that the plasticizers may effectively modify the properties of the composition. In general, a plasticizer tends to lower the modulus and tensile strength, and to increase the ultimate tensile elongation, impact strength, and tear strength of the polymeric product. The plasticizer may also be used to lower the melting point of the composition to thereby enable melt-processing at lower temperatures and to minimize energy requirements and thermal degradation. Although, plasticizers are typically not required in order to obtain the advantageous combination of properties discussed above.

Nonlimiting examples of plasticizers include hydroxyl plasticizers, sugar alcohols, polyols, hydrogen bond forming organic compounds which do not have hydroxyl group, including urea and urea derivatives, anhydrides of sugar alcohols, animal proteins, vegetable proteins, organic acid esters which are biodegradable, aliphatic acids, or the like. Further suitable plasticizers are those described in the above referenced U.S. Pat. Nos. 3,182,036 and 5,231,148. The plasticizers may be use alone or in mixtures thereof. Suitable molecular weights are less than about 20,000 g/mol, preferably less than about 5,000 g/mol and more preferably less than about 1,000 g/mol. If present, the amount of plasticizer in the final fiber composition is from about 2% to about 70%, more preferably from about 5% to about 55%, most preferably from about 10% to about 50%.

Optionally, other ingredients may be incorporated into the composition in quantities of less than about 50%, preferably from about 0.1% to about 20%, and more preferably from about 0.1% to about 12% by weight of the composition. The optional materials may be used to modify the processability and/or to modify physical properties such as elasticity, tensile strength and modulus of the final product. Other benefits include, but are not limited to, stability including oxidative stability, brightness, color, flexibility, resiliency, workability, processing aids, viscosity modifiers, and odor control.

Nonlimiting examples of other optional ingredients include aromatic/aliphatic polyester copolymers made more readily hydrolytically cleavable, and hence more likely biodegradable, such as those described in U.S. Pat. Nos. 5,053,482, 5,097,004, 5,097,005, and 5,295,985, biodegradable aliphatic polyesteramide polymers, polycaprolactones, polyesters or polyurethanes derived from aliphatic polyols (i.e., dialkanoyl polymers), polyamides including polyethylene/vinyl alcohol copolymers, cellulose esters or plasticized derivatives thereof, salts, slip agents, crystallization accelerators such as nucleating agents, crystallization retarders, odor masking agents, cross-linking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, antiblocking agents, antistatic agents, or mixtures thereof. Inorganic and organic fillers, such as clay, dirt, or various minerals, are particularly useful as fillers. Slip agents may be used to help reduce the tackiness or coefficient of friction in the fiber. Also, slip agents may be used to improve fiber stability, particularly in high humidity or temperatures. A suitable slip agent is polyethylene. A salt may also be added to the melt to make the fiber more water responsive or used as a processing aid. A salt will also function to help reduce the solubility of a binder so it does not dissolve, but when put in water or flushed, the salt will dissolve then enabling the binder to dissolve and create a more aqueous-responsive product. Further examples of other ingredients are known to one of skill in the art in light of the present disclosure.

(2) Configuration

The multiconstituent fibers of the present invention may be in many different configurations. Constituent, as used herein, is defined as meaning the chemical species of matter or the material. Fibers may be of monocomponent or multicomponent in configuration. Component, as used herein, is defined as a separate part of the fiber that has a spatial relationship to another part of the fiber.

Spunbond structures, staple fibers, hollow fibers, shaped fibers, such as multi-lobal fibers and multicomponent fibers can all be produced by using the compositions and methods of the present invention. Multicomponent fibers, commonly a bicomponent fiber, may be in a side-by-side, sheath-core, segmented pie, ribbon, or islands-in-the-sea configuration. The sheath may be continuous or non-continuous around the core. The ratio of the weight of the sheath to the core is from about 5:95 to about 95:5. The fibers of the present invention may have different geometries that include round, elliptical, star shaped, rectangular, and other various eccentricities. The fibers of the present invention may also be splittable fibers. Splitting may occur by rheological differences in the polymers, differential crystallization kinetics, or splitting may occur by a mechanical means and/or by fluid induced distortion.

For a bicomponent fiber, the PHA/PLA composition of the present invention may be both the sheath and the core with one of the components containing more PHA or PLA than the other component. Alternatively, the PHA/PLA composition of the present invention may be the sheath with the core being pure PLA or PHA. The PHA/PLA composition could also be the core with the sheath being pure PLA or PHA. The exact configuration of the fiber desired is dependent upon the use of the fiber.

In an alternative bicomponent fiber, the core comprises a PHA copolymer and the sheath comprises a PLA polymer or copolymer or combinations thereof. Alternatively, the core can comprise a PLA polymer or copolymer and the sheath comprise a PHA copolymer.

(3) Material Properties

The fibers produced in the present invention are environmentally degradable. "Environmentally degradable" is defined as being biodegradable, disintegratable, "aqueous-responsive," dispersible, flushable, or compostable or a combination thereof. In the present invention, the fibers, nonwoven webs, and articles are environmentally degradable. As a result, the fibers can be easily and safely disposed of either in existing composting facilities or may be flushable and can be safely flushed down the drain without detrimental consequences to existing sewage infrastructure systems. The environmental degradability of the fibers of the present inventions offer a solution to the problem of accumulation of such materials in the environment following their use in disposable articles. The flushability of the fibers of the present invention when used in disposable products, such as wipes and feminine hygiene items, offer additional convenience and discreteness to the consumer. Although biodegradability, disintegratability, "aqueous-responsiveness," dispersibility, compostibility, and flushability all have different criteria and are measured through different tests, generally the fibers of the present invention will meet more than one of these criteria.

In general, PLA polymers or copolymers take more time to degrade than PHA copolymers. The PHA copolymer constituent of the present blends will readily degrade by microbial or enzymatic activity thereby forming a porous structure which is more accessible to and which facilitates hydrolytic processing of the PLA constituent followed by biodegradation of PLA hydrolytic products.

Biodegradable is defined as meaning when the matter is exposed to an aerobic and/or anaerobic environment, the ultimate fate is reduction to monomeric components due to microbial, hydrolytic, and/or chemical actions. Under aerobic conditions, biodegradation leads to the transformation of the material into end products such as carbon dioxide and water. Under anaerobic conditions, biodegradation leads to the transformation of the materials into carbon dioxide, water, and methane. The biodegradability process is often described as mineralization. Biodegradability means that all organic constituents of the fibers are subject to decomposition eventually through biological activity.

A variety of different standardized biodegradability methods have been established by various organizations and in different countries. Although the tests vary in the specific testing conditions, assessment methods, and criteria desired, there is reasonable convergence between different protocols so that they are likely to lead to similar conclusions for most materials. For aerobic biodegradability, the American Society for Testing and Materials (ASTM) has established ASTM D 5338-92: Test Methods for Determining Aerobic Biodegradation of Plastic Materials Under Controlled Composting Conditions. The test measures the percent of test material that mineralizes as a function of time by monitoring the amount of carbon dioxide being released as a result of assimilation by microorganisms in the presence of active compost held at a thermophilic temperature of 58° C. Carbon dioxide production testing may be conducted via electrolytic respirometry. Other standard protocols, such 301B from the Organization for Economic Cooperation and Development (OECD), may also be used. Standard biodegradation tests in the absence of oxygen are described in various protocols such as ASTM D 5511-94. These tests are used to simulate the biodegradability of materials in an anaerobic solid-waste treatment facility or sanitary landfill.

The fibers of the present invention may also disintegrate. Disintegration occurs when the fibrous substrate has the ability to rapidly fragment and break down into fractions small enough not to be distinguishable after screening when composted or to cause drainpipe clogging when flushed. A disintegratable material may also be flushable. Most protocols for disintegratability measure the weight loss of test materials over time when exposed to various matrices. Both aerobic and anaerobic disintegration tests are used. Weight loss is determined by the amount of fibrous test material that is no longer collected on an 18 mesh sieve with 1 millimeter openings after the materials is exposed to wastewater and sludge. For disintegration, the difference in the weight of the initial sample and the dried weight of the sample recovered on a screen will determine the rate and extent of disintegration.

The fibers of the present invention will also be compostable. ASTM has developed test methods and specifications for compostibility. The test measures three characteristics: biodegradability, disintegration, and lack of ecotoxicity. Tests to measure biodegradability and disintegration are described above. To meet the biodegradability criteria for compostability, the material must achieve at least about 60% conversion to carbon dioxide within 40 days. For the disintegration criteria, the material must have less than 10% of the test material remain on a 2 millimeter screen in the actual shape and thickness that it would have in the disposed product. To determine the last criteria, lack of ecotoxicity, the biodegradation byproducts must not exhibit a negative impact on seed germination and plant growth. One test for this criteria is detailed in OECD 208. The International Biodegradable Products Institute will issue a logo for compostability once a product is verified to meet ASTM 6400-99 specifications. The protocol follows Germany's DIN 54900 which determine the maximum thickness of any material that allows complete decomposition within one composting cycle.

The fibers described herein are typically used to make disposable nonwoven articles that are commonly flushable. The term "flushable" as used herein refers to materials which are capable of dissolving, dispersing, disintegrating, and/or decomposing in a septic disposal system such as a toilet to provide clearance when flushed down the toilet without clogging the toilet or any other sewage drainage pipe. The fibers and resulting articles may also be aqueous responsive. The term aqueous responsive as used herein means that when placed in water or flushed, an observable and measurable change will result. Typical observations include noting that the article swells, pulls apart, dissolves, or observing a general weakened structure.

The fibers of the present invention may be thermally bondable. Thermally bondable fibers are required for the pressurized heat and thru-air heat bonding methods. PHA blended with PLA can improve the bonding characteristics of the fibers over PLA alone for highly oriented PLA fibers.

A "highly attenuated fiber" is defined as a fiber having a high draw down ratio. The total fiber draw down ratio is defined as the ratio of the fiber at its maximum diameter (which is typically results immediately after exiting the capillary) to the final fiber diameter in its end use. The total fiber draw down ratio via either staple, spunbond, or meltblown process will be greater than 1.5, preferable greater than 5, more preferably greater than 10, and most preferably greater than 12. This is necessary to achieve the tactile properties and useful mechanical properties.

Preferably, the highly attenuated fiber will have a diameter of less than 200 micrometers. More preferably the fiber diameter will be 100 micrometer or less, even more preferably 50 micrometers or less, and most preferably less than 30 micrometers. Fibers commonly used to make nonwovens will have a diameter of from about 5 micrometers to about 30 micrometers. Fiber diameter is controlled by spinning speed (or total draw down ratio), mass through-put, and blend composition.

(4) Processes

The first step in producing a fiber is the compounding or mixing step in which the raw materials are heated, typically under shear. The shearing in the presence of heat will result in a homogeneous melt with proper selection of the composition. The melt is then placed in an extruder where fibers are formed. A collection of fibers is combined together using heat, pressure, chemical binder, mechanical entanglement, or combinations thereof resulting in the formation of a nonwoven web. The nonwoven is then assembled into an article.

The most preferred mixing device is a multiple mixing zone twin screw extruder. A twin screw batch mixer or a single screw extrusion system can also be used. As long as sufficient mixing and heating occurs, the particular equipment used is not critical. Further, a side extruder off of the main extruder may be used to inject a polymer melt in the main extruder.

An alternative method for compounding the materials is by adding the polymers to an extrusion system where they are mixed in progressively increasing temperatures. For example, in a twin screw extruder with six heating zones, the first three zones may be heated to 90°, 120°, and 130° C., and the last three zones will be heated above the melting point of the polymer.

The present invention utilizes the process of melt spinning. In melt spinning, there is no mass loss in the extrudate. Melt spinning is differentiated from other spinning, such as wet or dry spinning from solution, where a solvent is being eliminated by volatilizing or diffusing out of the extrudate resulting in a mass loss.

Spinning will occur at temperatures of 100° C. to 270° C., preferably 120° C. to 230° C., and more preferably at 170° C. to 210° C. The processing temperature is determined by the chemical nature, molecular weights and concentration of each component.

Fiber spinning speeds of greater than 100 meters/minute are required. Preferably, the fiber spinning speed is from about 500 to about 10,000 meters/minute, more preferably from about 2,000 to about 7,000 meters/minute, and most preferably from about 2,500 to about 5,000 meters/minute. Continuous fibers can be produced through spunbond methods or meltblowing processes, or non-continuous (staple) fibers can be produced. The various methods of fiber manufacturing can also be combined to produce a combination technique.

The homogeneous blend can be melt spun into fibers on conventional melt spinning equipment. The fibers spun can be collected using conventional godet winding systems or through air drag attenuation devices. If the godet system is used, the fibers can be further oriented through post extrusion drawing at temperatures from about 50 to about 140° C. The drawn fibers may then be crimped and/or cut to form non-continuous fibers (staple fibers) used in a carding, airlaid, or fluidlaid process.

After the fiber is formed, the fiber may further be treated or the bonded fabric can be treated. A hydrophilic, hydrophobic, or surfactant finish can be added to adjust the surface energy and chemical nature of the fibers or fabric. For example, fibers that are hydrophobic may be treated with wetting agents to facilitate absorption of aqueous liquids. A bonded fabric can also be treated with a topical solution containing surfactants, pigments, slip agents, salt, or other materials to further adjust the surface properties of the fiber.

(5) Articles

The fibers of the present invention may be used to make nonwoven webs, among other suitable articles. Nonwoven articles are defined as articles that contains greater than 15% of a plurality of fibers that are continuous or non-continuous and physically and/or chemically attached to one another. The fibers may be converted to nonwovens by different bonding methods. Continuous fibers can be formed into a web using industry standard spunbond type technologies while staple fibers can be formed into a web using industry standard carding, airlaid, or wetlaid technologies. Typical bonding methods include: calendar (pressure and heat), thru-air heat, mechanical entanglement, hydrodynamic entanglement, needle punching, and chemical bonding and/ or resin bonding. The calendar, thru-air heat, and chemical bonding are the preferred bonding methods. Thermally bondable fibers are required for the pressurized heat and thru-air heat bonding methods.

The fibers of the present invention may also be bonded or combined with other synthetic or natural fibers to make nonwoven articles. The synthetic or natural fibers may be blended together in the forming process or used in discrete layers. Suitable synthetic fibers include fibers made from polypropylene, polyethylene, polyester, polyacrylates, copolymers thereof, mixtures thereof, or the like. Natural fibers include cellulosic fibers, derivatives thereof, or fibers made from processed natural cellulosic resources such as rayon or starch.

The nonwoven may be combined with additional nonwovens or films to produce a layered product used either by itself or as a component in a complex combination of other materials, such as a baby diaper or feminine care pad. Preferred articles are disposable, nonwoven articles. The resultant products may find use in filters for air, oil and water; vacuum cleaner filters; furnace filters; face masks; coffee filters, tea or coffee bags; thermal insulation materials and sound insulation materials; nonwovens for one-time use sanitary products such as diapers, feminine pads, and incontinence articles; biodegradable textile fabrics for improved moisture absorption and softness of wear such as micro fiber or breathable fabrics; an electrostatically charged, structured web for collecting and removing dust; reinforcements and webs for hard grades of paper, such as wrapping paper, writing paper, newsprint, corrugated paper board, and webs for tissue grades of paper such as toilet paper, paper towel, napkins and facial tissue; medical uses such as surgical drapes, wound dressing, bandages, or dermal patches; and dental uses such as dental floss or toothbrush bristles. The fibrous web may also include odor absorbents, termite repellants, insecticides, rodenticides, and the like, for specific uses. The resultant product absorbs water and oil and may find use in oil or water spill clean-up, or controlled water retention and release for agricultural or horticultural applications. The resultant fibers or fiber webs may also be incorporated into other materials such as saw dust, wood pulp, plastics, and concrete, to form composite materials, which can be used as building materials such as walls, support beams, pressed boards, dry walls and backings, and ceiling tiles; other medical uses such as casts, splints, and tongue depressors; and in fireplace logs for decorative and/or burning purpose. Preferred articles of the present invention include disposable nonwovens for hygiene and medical applications. Hygiene applications include such items as wipes; diapers, particularly the top sheet or back sheet; and feminine pads or products, particularly the top sheet.

COMPARABLE EXAMPLE 1

This example demonstrates the melt spinning of a PLA polymer. A crystalline poly(lactic acid) (PLA) is melt spun into fibers using a vertical single-screw extruder which is mounted on a platform that can be raised and lowered, and which is equipped with a single-hole capillary die and a 0.5 millimeter diameter capillary (2:1 length-to-diameter ratio). The molten filament exits the capillary die into ambient air at approximately 25° C., and is drawn down with a height adjustable air drag device that uses compressed air supplied at high pressures to produce a stream of air that surrounds and draws the filament. The extruder output is kept relatively constant at about 1.5 grams per minute per hole, while the distance between the die exit and the air gun, the distance between the air gun and the collection screen, the extruder and die temperatures, as well as the air gun pressure are varied to achieve and collect fiber diameters of less than about 25 microns in diameter. With PLA, there is no fiber blocking or roping, and fibers with diameters in the range of 18–23 microns are collected. This example demonstrates that the PLA polymer by itself is melt spinnable, and thereby useful as a sheath material in the present invention.

EXAMPLE 2

This example demonstrates the melt spinning of binary blends comprising a preferred polyhydroxyalkanoate copolymer and a PLA polymer. Specifically, blends containing a polyhydroxyalkanoate copolymer of 3-hydroxybutyrate with about 12 mole percent 3-hydroxyhexanoate (hereafter a PHBH copolymer) and the PLA polymer from Example 1 are first prepared by melt compounding in a twin-screw extruder at temperatures and screw speeds that ensure good mixing of the two components, and where the level of PHBH is varied from 10 to 70 weight percent based on the total weight of PHBH and PLA. Each compounded PHBH/PLA blend is melt spun into fibers using the procedure outlined in Example 1. For PHBH levels less than about 35 weight percent, there is no observable fiber recoil or residual tackiness, and fibers with diameters in the range of 20–25 microns are collected. Comparing the tactile properties of these PHBH/PLA fibers with those of the neat PLA from Example 1 shows an appreciable enhancement in softness with the addition of these low-to-moderate levels of PHBH to PLA. For PHBH levels between about 40 and 65 weight percent, there is some fiber recoil and residual tackiness that leads to many of the fibers sticking to each other, and fibers with diameters in the range of 23–46 microns are collected. These fiber samples can be teased so as to break many of the fiber/fiber bonds and yield fiber samples with a texture similar to "cotton balls". For PHBH levels greater than about 70 weight percent, there is substantial fiber recoil and residual tackiness that leads to the fibers sticking to each other, and fibers with diameters in the range of 36–53 microns are collected. This example further demonstrates for this particular polyhydroxyalkanoate that (i) PHBH/PLA blends are melt spinnable, (ii) PHBH/PLA blends with less than about 35 weight percent PHBH are particularly useful as sheath materials in the present invention when the intent is to isolate the core region and to melt spin tack-free fibers, and (iii) PHBH/PLA blends with greater than about 40 weight percent PHBH are particularly useful as a sheath material in the present invention when the intent is to isolate the core region and to melt spin fibers for in-situ binding purposes, where it is preferred for this application that the PHBH/PLA blends contain less than about 70 weight percent PHBH.

EXAMPLE 3

This example demonstrates the melt spinning of a ternary blend comprising a preferred polyhydroxyalkanoate copolymer, a PLA polymer, and a preferred moisture sensitive polymer. Specifically, a blend of the PHBH copolymer from Example 2, the PLA polymer from Example 1, and a polyethylene oxide (PEO) polymer are first prepared by the melt compounding procedure in Example 2, where the PHA level is 20 weight percent, the PLA level is 64 weight percent, and the PEO level is 16 weight percent. The compounded PHBH/PLA/PEO blend is melt spun into fibers using the procedure outlined in Example 2, and fibers with diameters in the range of 14–25 microns are collected. Comparing the tactile properties of these PHBH/PLA/PEO fibers with those of the 20/80 and 40/60 PHBH/PLA blends from Example 2 and with those of the neat PLA from Example 2 shows an appreciable enhancement in softness with the addition of a small amount of PEO to the PHBH/PLA blends, where the PHA level in the first PHBH/PLA blend is the same as that in the PHBH/PLA/PEO blend and the PLA level in the second PHBH/PLA blend is similar to that in the PHBF/PLA/PEO blend. This example further demonstrates that a judicious blend of preferred materials can remain melt spinnable, and thereby useful as a sheath material in the present invention, while providing superior softness as compared to some of the individual materials or combinations thereof.

EXAMPLE 4

This example demonstrates the melt spinning of a bicomponent fiber using PHA from Example 2 in the core. A PLA resin from Biomer, L5000, was used in the sheath and PHA in the core in sheath to core ratio of 20/80, 40/60, 60/40 and 80/20. Fiber diameters ranged from 20 to 35 microns. This example illustrates the use of a high Tg polymer with PHA for making bicomponent fibers.

EXAMPLE 5

This example demonstrates the melt spinning of a bicomponent fiber using PHA from Example 2 in the core with mechanical drawing. A PLA resin from Biomer, L5000, was used in the sheath and PHA in the core in sheath to core ratio of 50/50. Fibers were mechanically drawn using a godet at 200 m/min and then mechanically drawn at up to a draw ratio of 5. The draw temperature was 40° C.

The disclosures of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the present invention have been illustrated and described, it would be obvious to those skilled in the art in light of the present disclosure that various other changes and modifications can be made without departing from the spirit and scope of the invention. It is intended to cover in the appended claims all such changes and modifications that are within the scope of the invention.

What is claimed is:

1. An environmentally degradable melt spun composition comprising:

a PLA polymer or copolymer; and a polyhydroxyalkanoate copolymer comprising at least two randomly repeating monomer units wherein a first monomer unit has structure (I)

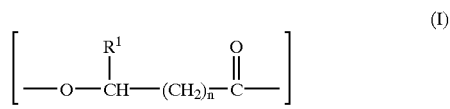

where $R^1$ is H, or C1 or C2 alkyl, and n is 1 or 2; and wherein a second monomer unit has structure (II)

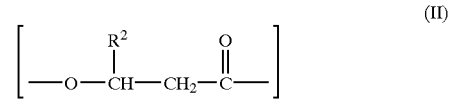

where $R^2$ is a C3–C9 alkyl or C3–C9 alkenyl, wherein the composition is in the form of a fiber having a diameter of about 50 micrometers or less.

2. The composition of claim 1 wherein the polyhydroxyalkanoate copolymer comprises a third randomly repeating monomer having structure (IV):

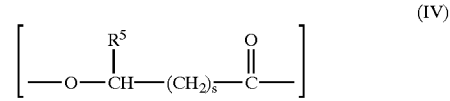

where $R^5$ is H, or C1–C19 alkyl or alkenyl, and s is 1 or 2, with the proviso that the third monomer is not the same as the first or second monomer.

3. The composition of claim 1 further comprising a second polyhydroxyalkanoate polymer or copolymer.

4. The composition of claim 1 wherein the polyhydroxyalkanoate copolymer is present in an amount of from 10% to 90% by weight of the fiber.

5. The composition of claim 1 wherein the PLA polymer or copolymer is present in an amount of from 10% to 90% by weight of the fiber.

6. The composition of claim 1 comprising a PLA polymer and wherein the PLA polymer is crystallizable polylactic acid having a melting temperature of from 160° C. 175° C.

7. An environmentally degradable fiber produced by melt spinning a composition comprising a polyhydroxyalkanoate copolymer and a PLA polymer or copolymer, wherein said polyhydroxyalkanoate copolymer comprises at least two randomly repeating monomer units wherein a first monomer unit has structure (I)

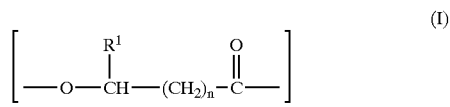

where $R^1$ is H, or C1 or C2 alkyl, and n is 1 or 2; and wherein a second monomer unit has structure (II)

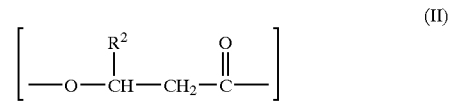

where $R^2$ is a C3–C9 alkyl or C3 C9 alkenyl, wherein the fiber has a diameter of about 50 micrometers or less.

8. An environmentally degradable composition comprising a 3-hydroxybutyrate/3-hydroxyhexanoate copolymer and a PLA polymer or copolymer wherein the composition is in the form of a fiber having a diameter at about 50 micrometers or less.

9. An environmentally degradable multicomponent fiber wherein at least one component has a composition comprising:

a PLA polymer or copolymer; and a polyhydroxyalkanoate copolymer comprising at least two randomly repeating monomer units wherein a first monomer unit has structure (I)

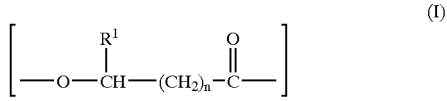
(I)

where $R^1$ is H, or C1 or C2 alkyl, and n is 1 or 2; and
wherein a second monomer unit has structure (II)

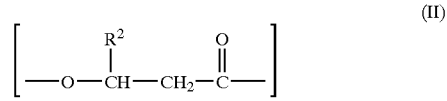
(II)

where $R^2$ is a C3–C19 alkyl or C3–C19 alkenyl,
wherein the composition is in the form of a fiber having a diameter of about 50 micrometers or less.

10. An environmentally degradable multicomponent fiber wherein a first component comprises a polyhydroxyalkanoate copolymer comprising at least two randomly repeating monomer units wherein a first monomer unit has structure (I)

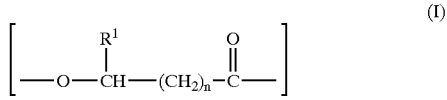
(I)

where $R^1$ is H, or C1 or C2 alkyl, and n is 1 or 2; and
wherein a second monomer unit has structure (II)

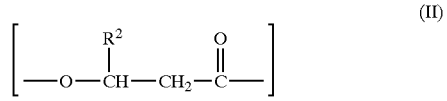
(II)

where $R^2$ is a C3–C19 alkyl or C3–C19 alkenyl, and a second component comprises a PLA polymer or copolymer,
wherein said fiber has a diameter of about 50 micrometers or less.

11. An environmentally degradable biocomponent fiber comprising a sheath-core configuration wherein the core is a 3-hydroxybutyrate/3-hydroxyhexanoate copolymer and the sheath is a PLA polymer or copolymer wherein said fiber has a diameter of about 50 micrometers or less.

12. The environmentally degradable multicomponent fiber of claim 10 wherein the fiber has two components having a sheath-core configuration wherein the first component is the sheath and the second component is the core.

13. The environmentally degradable multicomponent fiber of claim 10 wherein the fiber has two components having a sheath-core configuration wherein the first component is the core and the second component is the sheath.

14. A nonwoven web comprising the fiber of claim 1.

15. A nonwoven web comprising the multicomponent fiber of claim 9.

16. A nonwoven web comprising the multicomponent fiber of claim 10.

17. A disposable article comprising the nonwoven web of claim 14.

18. A disposable article comprising the nonwoven web of claim 15.

19. A nonwoven web comprising the fiber of claim 8.

20. A disposable article comprising the nonwoven web of claim 19.

21. The composition of claim 1 wherein the fiber has a diameter of about 30 micrometers or less.

* * * * *